(12) United States Patent
Nakanishi

(10) Patent No.: US 8,413,053 B2
(45) Date of Patent: Apr. 2, 2013

(54) VIDEO REPRODUCING APPARATUS AND VIDEO REPRODUCING METHOD

(75) Inventor: Akira Nakanishi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 132 days.

(21) Appl. No.: 12/840,874

(22) Filed: Jul. 21, 2010

(65) Prior Publication Data
US 2011/0154201 A1 Jun. 23, 2011

(30) Foreign Application Priority Data
Dec. 22, 2009 (JP) .................................. 2009-290457

(51) Int. Cl.
G06F 3/00 (2006.01)
G01B 11/30 (2006.01)
G06K 9/00 (2006.01)

(52) U.S. Cl. .......................... 715/716; 356/610; 382/154

(58) Field of Classification Search .................. 715/716; 356/610; 382/154
See application file for complete search history.

(56) References Cited

U.S. PATENT DOCUMENTS

| | | | |
|---|---|---|---|
| 6,101,269 A * | 8/2000 | Hunter et al. ................. | 382/154 |
| 6,825,985 B2 * | 11/2004 | Brown et al. ................. | 359/619 |
| 7,433,024 B2 * | 10/2008 | Garcia et al. ................. | 356/4.01 |
| 7,551,719 B2 * | 6/2009 | Yokhin et al. ................. | 378/90 |
| 8,050,461 B2 * | 11/2011 | Shpunt et al. ................. | 382/106 |
| 8,090,194 B2 * | 1/2012 | Golrdon et al. ................ | 382/154 |
| 2007/0057946 A1 * | 3/2007 | Albeck et al. ................. | 345/427 |
| 2007/0060336 A1 * | 3/2007 | Marks et al. ................... | 463/30 |
| 2007/0262965 A1 | 11/2007 | Hirai et al. | |
| 2008/0018595 A1 * | 1/2008 | Hildreth et al. ............... | 345/156 |
| 2008/0052643 A1 | 2/2008 | Ike et al. | |
| 2008/0106746 A1 * | 5/2008 | Shpunt et al. ................. | 356/610 |
| 2008/0240502 A1 * | 10/2008 | Freedman et al. ............. | 382/103 |
| 2009/0096783 A1 * | 4/2009 | Shpunt et al. ................. | 345/419 |
| 2009/0183125 A1 * | 7/2009 | Magal et al. .................. | 715/863 |
| 2010/0020078 A1 * | 1/2010 | Shpunt .......................... | 345/420 |

(Continued)

FOREIGN PATENT DOCUMENTS

| | | |
|---|---|---|
| JP | 2004-078977 | 3/2004 |
| JP | 2006-072854 | 3/2006 |
| JP | 2008-052590 | 3/2008 |
| JP | 4-318056 | 8/2009 |

OTHER PUBLICATIONS

English machine translation of Japanese Patent No. JP 4-318056 (B1).

*Primary Examiner* — William Bashore
*Assistant Examiner* — David Phantana Angkool
(74) *Attorney, Agent, or Firm* — Blakely, Sokoloff, Taylor & Zafman LLP

(57) ABSTRACT

In one embodiment, a video reproducing apparatus includes: a module that acquires a distance image including distance information between a user and a distance sensor; a module that calculates a distance-based center of the user based on the distance image; a module that calculates a user instruction coordinate based on a relationship between the distance information and the distance-based center; a module that sets a reference plane based on the distance-based center, and calculates a distance between the distance sensor and the reference plane; a module that acquires, from the distance image, an image of the user that is located between the distance sensor and the reference plane, and generates a user instruction image based on the acquired image; a module that generates an operation subject image; and a module that combines the user instruction image with the operation subject image.

3 Claims, 8 Drawing Sheets

U.S. PATENT DOCUMENTS

2010/0118123 A1* 5/2010 Freedman et al. .............. 348/46
2011/0141009 A1 6/2011 Izumi
2011/0158508 A1* 6/2011 Shpunt et al. ................. 382/154
2011/0211044 A1* 9/2011 Shpunt et al. ................... 348/46

* cited by examiner

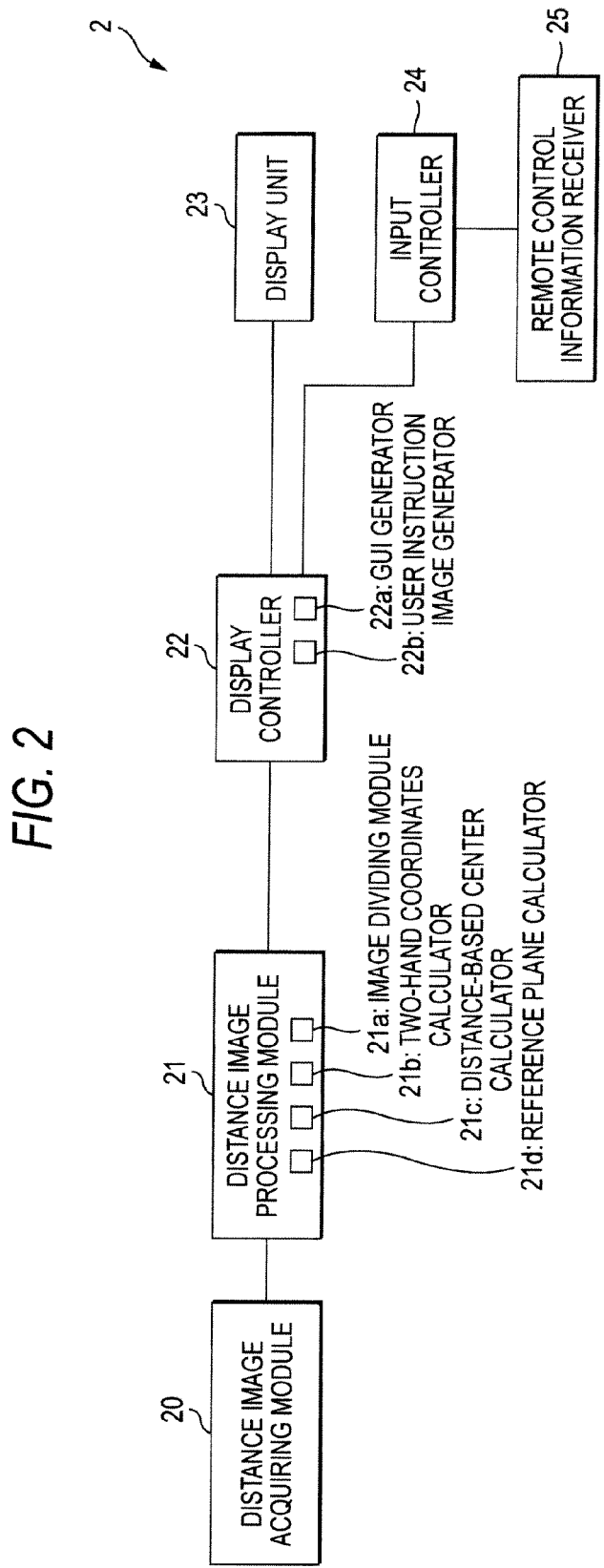

FIG. 3A
FIG. 3B
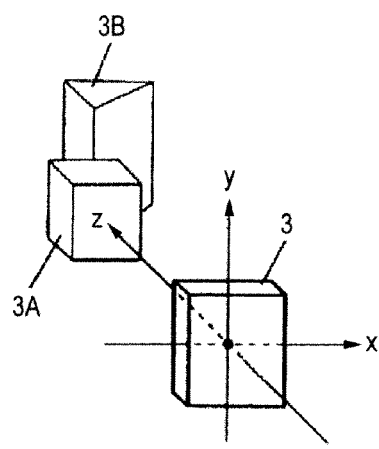
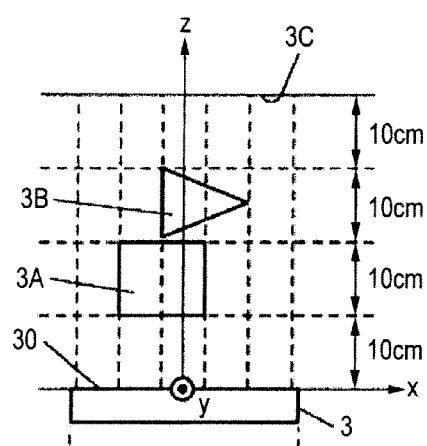
FIG. 3C
FIG. 3D
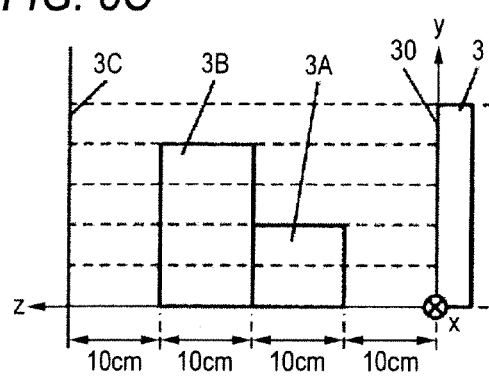
| 0 | 0 | 0  | 0  | 0 |
|---|---|----|----|---|
| 0 | 0 | 20 | 25 | 0 |
| 0 | 0 | 20 | 25 | 0 |
| 0 | 10| 10 | 25 | 0 |
| 0 | 10| 10 | 25 | 0 |
FIG. 3E
| 0 | 0 | 0  | 0  | 0 |
|---|---|----|----|---|
| 0 | 0 | 20 | 25 | 0 |
| 0 | 0 | 20 | 25 | 0 |
| 0 | 10| 10 | 25 | 0 |
| 0 | 10| 10 | 25 | 0 |
30B, 30A
FIG. 3F
| 0 | 0 | 0  | 0  | 0 |
|---|---|----|----|---|
| 0 | 0 | 20 | 15 | 0 |
| 0 | 0 | 20 | 15 | 0 |
| 0 | 30| 30 | 15 | 0 |
| 0 | 30| 30 | 15 | 0 |
30B, 30A

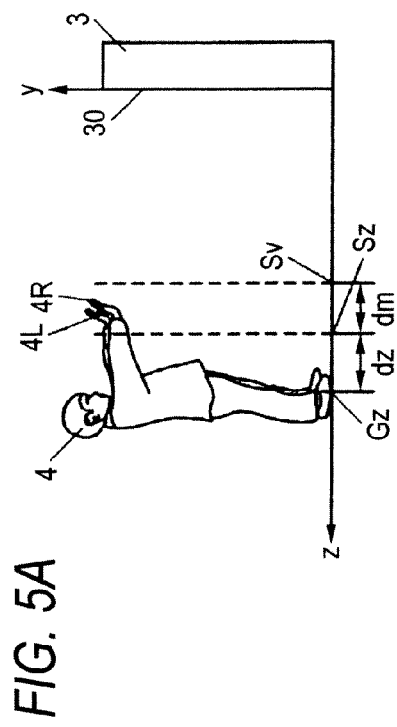
FIG. 5A
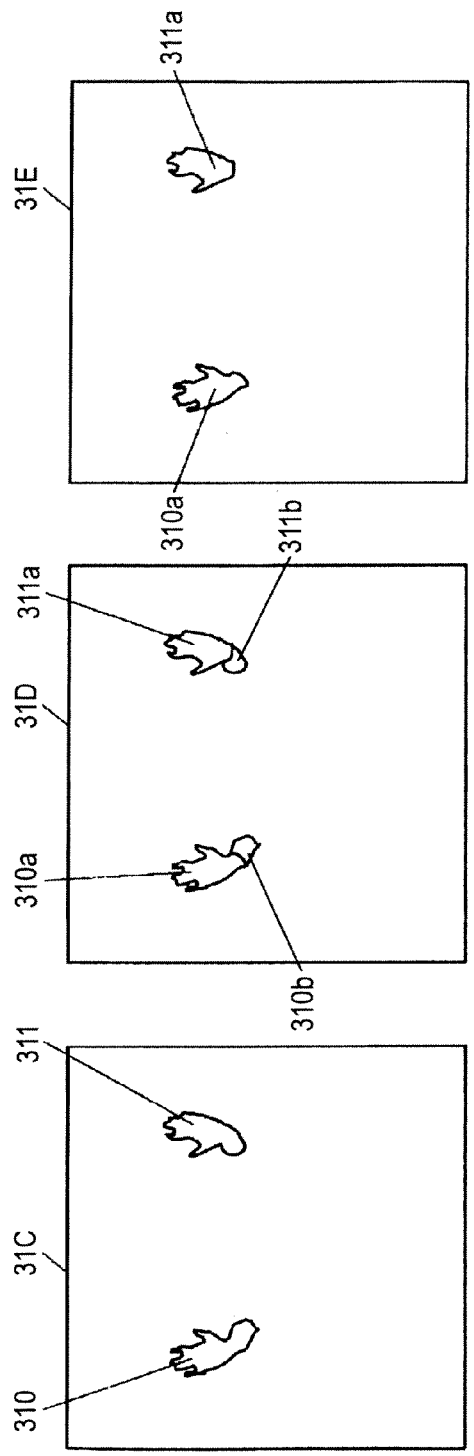
FIG. 5B
FIG. 5C
FIG. 5D

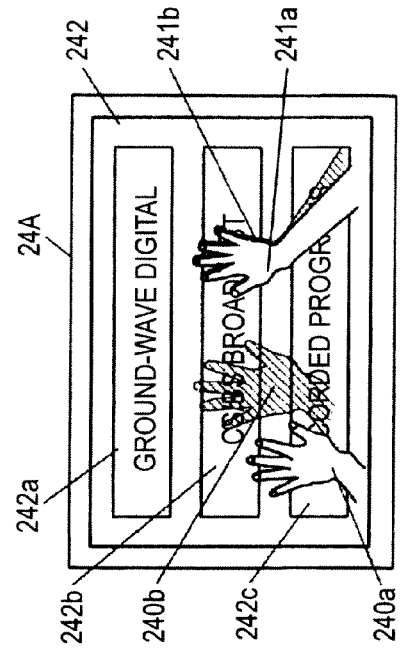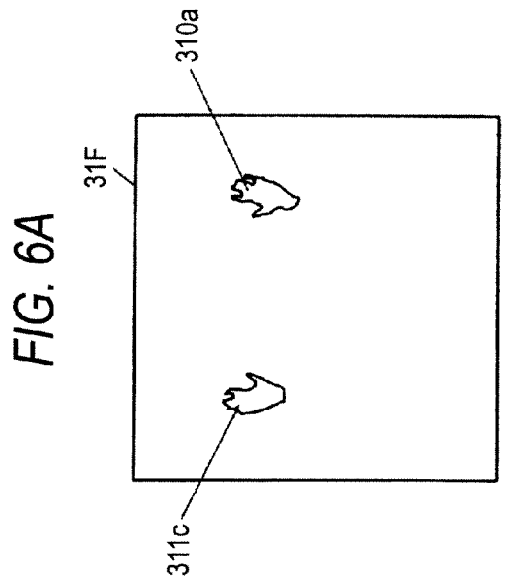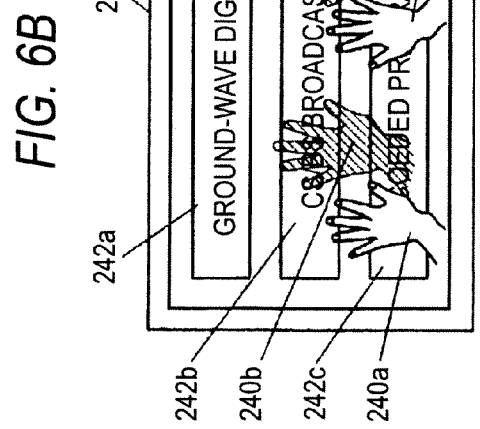
FIG. 6A
FIG. 6B
FIG. 6C

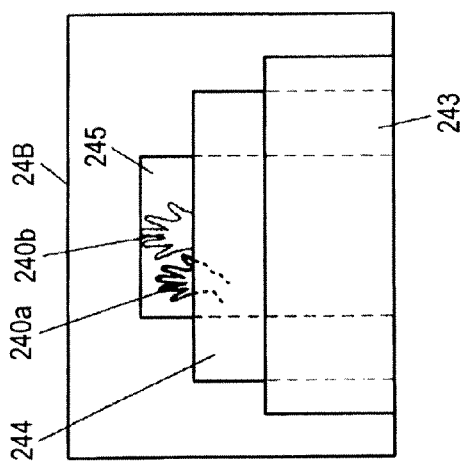
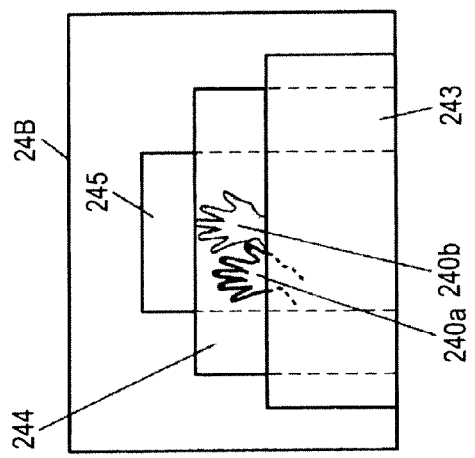
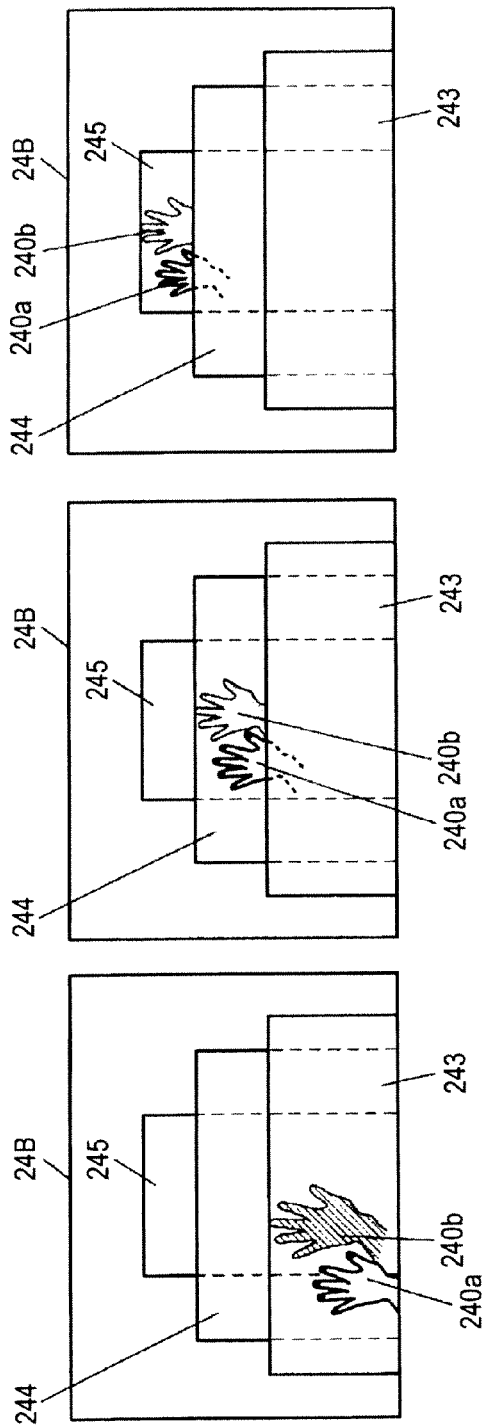
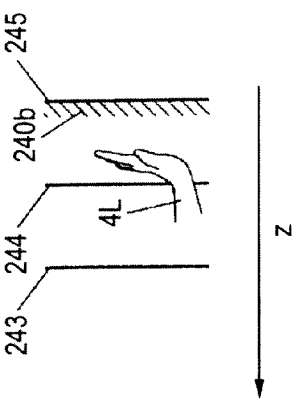
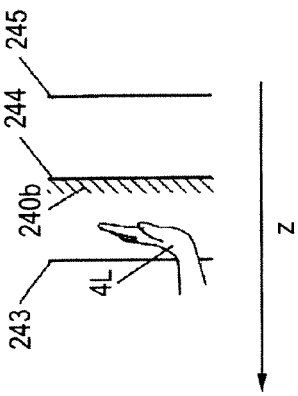
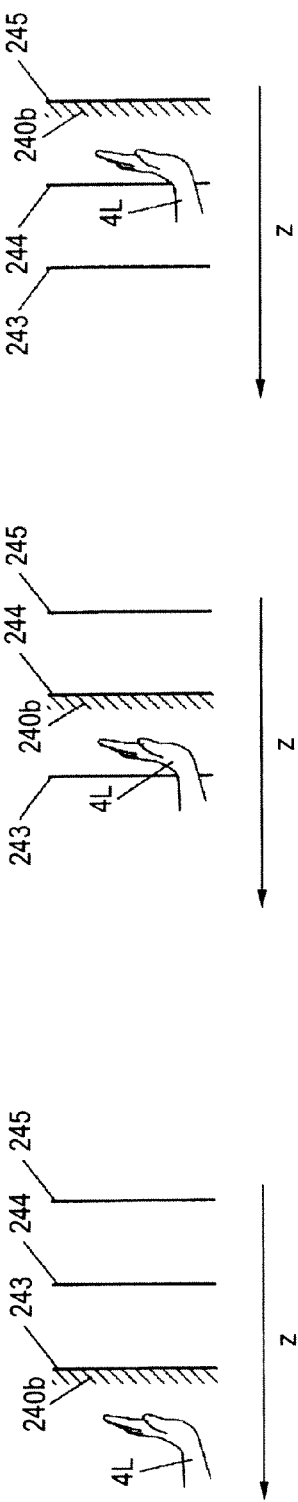

VIDEO REPRODUCING APPARATUS AND VIDEO REPRODUCING METHOD

CROSS-REFERENCE TO RELATED APPLICATION

This application claims priority from Japanese Patent Application No. 2009-290457, filed on Dec. 22, 2009, the entire contents of which are hereby incorporated by reference.

BACKGROUND

1. Field

Embodiments described herein generally relate to a video reproducing apparatus and a video reproducing method.

2. Description of the Related Art

A video reproducing apparatus is known which can be operated as if the user were actually touching a GUI (graphic user interface) that is displayed on the display screen.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is a block diagram showing the configuration of a main body of the video reproducing apparatus;

FIGS. 3A-3F schematically show a distance information acquiring operation of a distance image acquiring module;

FIGS. 5A-5D schematically show an example relationship between the distance-based center and an operation reference plane and an example relationship between a distance image and the operation reference plane;

FIGS. 6A-6C schematically show an example operation of generating user instruction images from a distance image and an example operation of combining the user instruction images with a GUI image;

FIGS. 7A-7F schematically show another example operation of combining user instruction images with GUI images.

DETAILED DESCRIPTION

According to exemplary embodiments of the present invention, there is provided a video reproducing apparatus. The video reproducing apparatus includes: a distance image acquiring module configured to acquire a distance image in which distance information between a user and a distance sensor are stored for respective pixels of the distance sensor; a distance-based center calculator configured to calculate a distance-based center of the user based on the distance image; a user instruction coordinate calculator configured to calculate a user instruction coordinate based on a relationship between the distance information and the distance-based center, wherein the user instruction coordinate represents a position where an instruction from the user is given; a reference plane calculator configured to set a reference plane based on the distance-based center, and calculate a distance between the distance sensor and the reference plane; a user instruction image generator configured to acquire, from the distance image, an image of the user that is located between the distance sensor and the reference plane, and generate a user instruction image based on the acquired image; an operation subject image generator configured to generate an operation subject image which is an operation subject of the user instruction image; and a display controller configured to combine the user instruction image with the operation subject image, based on a positional relationship between the user instruction coordinate and a virtual operation plane which is set at a given position from the reference plane.

According to exemplary embodiments of the present invention, there is provided a video reproducing method. The video reproducing method includes: (a) acquiring a distance image in which distance information between a user and a distance sensor are stored for respective pixels of the distance sensor; (b) calculating a distance-based center of the user based on the distance image; (c) calculating a user instruction coordinate based on a relationship between the distance information and the distance-based center; (d) setting a reference plane based on the distance-based center, and calculating a distance between the distance sensor and the reference plane; (e) acquiring, from the distance image, an image of the user that is located between the distance sensor and the reference plane, and generating a user instruction image based on the acquired image; (f) generating an operation subject image which is an operation subject of the user instruction image; and (g) combining the user instruction image with the operation subject image, based on a positional relationship between the user instruction coordinate and a virtual operation plane which is set at a given position from the reference plane.

A video display apparatus and a video display method according to an embodiment of the present invention will be hereinafter described in detail with reference to the drawings.

Figure 1:
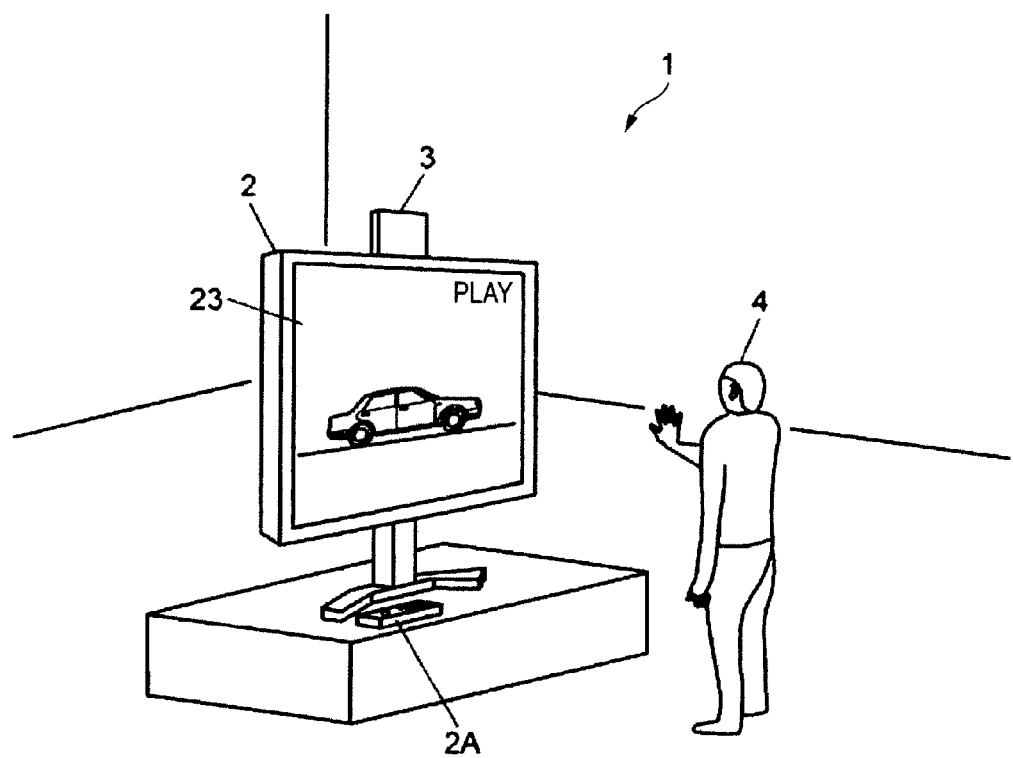
FIG. 1 schematically shows the configuration of a video reproducing apparatus according to an embodiment of the present invention.

FIG. 1 schematically shows the configuration of a video reproducing apparatus according to the embodiment of the invention.

The video reproducing apparatus 1, which can reproduce a video content or the like received by a tuner that is provided inside a main body 2, displays reproduced video on a display unit 23 having a display screen such as an LCD (liquid crystal display).

The video reproducing apparatus 1 has a distance sensor 3 for acquiring distance information of objects including a user 4. The user 4 faces the video reproducing apparatus 1 and operates according to the distance information acquired by the distance sensor 3. The distance sensor 3 includes, for example, an infrared camera having an infrared laser and plural photodetecting elements, acquires distance information in image form by shooting a reflection image of infrared light emitted from the infrared laser with the infrared camera. As described later, the video reproducing apparatus 1 operates according to a gesture of the user 4 that is recognized using distance information.

The video reproducing apparatus 1 is also equipped with a remote controller 2A having plural operation switches and a remote control receiving unit (not shown; provided in the main body 2) for receiving an operation signal that is transmitted from the remote controller 2A in response to an operation of an operation switch. The video reproducing apparatus 1 thus operates according to an operation signal.

FIG. 2 is a block diagram showing the configuration of the main body 2 of the video reproducing apparatus 1.

The main body 2 of the video reproducing apparatus 1 includes a distance image acquiring module 20, a distance image processing module 21, a display controller 22, the display unit 23, an input controller 24, and a remote control information receiver 25.

The distance image acquiring module 20 acquires, as a distance image, distance information of plural pixels acquired by the distance sensor 3.

The distance image processing module 21 processes the distance image acquired by the distance image acquiring module 20 by means of an image dividing module 21a, a distance-based center calculator 21c, a reference plane calculator 21d, and a two-hand coordinates calculator 21b.

The image dividing module 21a divides the distance image into plural regions based on the distance information of the plural pixels. The two-hand coordinates calculator 21b detects both hands of the user from the distance image as operation commanding positions. The distance-based center calculator 21c calculates the distance-based center in the depth direction and the distance-based center in a plane parallel with the x-y plane of the user 4. The reference plane calculator 21d sets a virtual operation reference plane for the user 4.

The display controller 22 includes a GUI generator 22a and a user instruction image generator 22b, and generates a display image.

The GUI generator 22a generates a GUI image such as switches as operation subjects. The user instruction image generator 22b processes an image that is output from the image dividing module 21a based on reference plane information that is calculated by the reference plane calculator 21d, and generates user instruction images which are simulated hands of the user 4. Furthermore, the user instruction image generator 22b generates shadow images which are paired with the respective user instruction images according to the relationship between the sets of coordinates of both hands detected by the two-hand coordinates calculator 21b and the reference plane information.

The display unit 23 displays video received by the tuner and the user instruction images and the GUI image as combined by the display controller 22.

The input controller 24 controls the individual modules of the video reproducing apparatus 1 based on a control signal that is output from the display controller 22. The input controller 24 also controls the individual modules of the video reproducing apparatus 1 based on a control signal that is output from the remote control information receiver 25 (described below).

The remote control information receiver 25 receives, via the remote control receiving unit, an operation signal that is transmitted from the remote controller 2A.

(Operations)

How the video reproducing apparatus 1 operates will be described below with reference to FIGS. 1 to 8A-8F in order of (1) a distance information acquiring operation, (2) a distance image dividing operation, (3) a two-hand coordinates calculating operation, (4) a distance-based center calculating operation, (5) an operation of determining an operation reference plane and a virtual operation plane, (6) a user instruction image generating operation and an image combining operation, and (7) other operations.

When a user 4 faces a detection surface 30 of the distance sensor 3, the distance sensor 3 detects the user 4 as an object to be detected and acquires distance information for the user 4. A distance information acquiring operation of the distance sensor 3 will be described below.

(1) Distance Information Acquiring Operation

FIGS. 3A-3F schematically show a distance information acquiring operation of the distance image acquiring module 20. FIG. 3A is a perspective view, FIG. 3B is a plan view as viewed from the positive direction of the y axis, and FIG. 3C is a side view as viewed from the negative direction of the x axis.

As shown in FIGS. 3A-3C, the distance sensor 3 has the detection surface 30 in the x-y plane (z=0). Where objects 3A and 3B to be detected are disposed at such positions as to be opposed to the detection surface 30, the distance sensor 3 acquires distance information for the respective pixels in a manner shown in FIG. 3D.

The distance information shown in FIG. 3D represent distances in centimeters between the objects 3A and 3B and respective divisional detection surfaces obtained by dividing the detection surface 30 into 25 parts. If there is no confronting object or an object is more distant from the divisional detection surface than a reference plane 3C is which is distant from the detection surface 30 by 40 cm, distance information "0 cm" is given. Although 25 divisional detection surfaces are used in this example for the sake of simplicity of the description, 640×480 divisional detection surfaces, for example, are used actually (this number is the same as the VGA (video graphic array) resolution). The upper limit of the division number (the number of pixels) is the number of photodetecting elements of the distance sensor 3.

(2) Distance Image Dividing Operation

Then, when acquiring the distance information shown in FIG. 3D from the distance image acquiring module 20, as shown in FIG. 3E the image dividing module 21a of the distance image processing module 21 groups distance information having similar distance values into divisional regions 30A and 30B.

Then, as shown in FIG. 3F, the distance image acquiring module 20 converts the acquired distance values into ones measured from the depth reference plane 3C (distant from the detection surface 30 by 40 cm). More specifically, distance information shown in FIG. 3F are obtained according to an operation $40-d_n$, where $d_n$ is the distance value of each pixel shown in FIG. 3E. The above-mentioned position (40 cm) of the depth reference plane 3C is just an example, and the position of the depth reference plane 3C is determined at the time of shipment from a factory so as to be proportional to the screen size of the display unit 23. For example, where a distance sensor that is an attachment for a 50-inch TV receiver is used, the distance of the depth reference plane 3C from the detection surface 30 is set to 5 m.

(3) Two-Hand Coordinates Calculating Operation

Figure 4C:
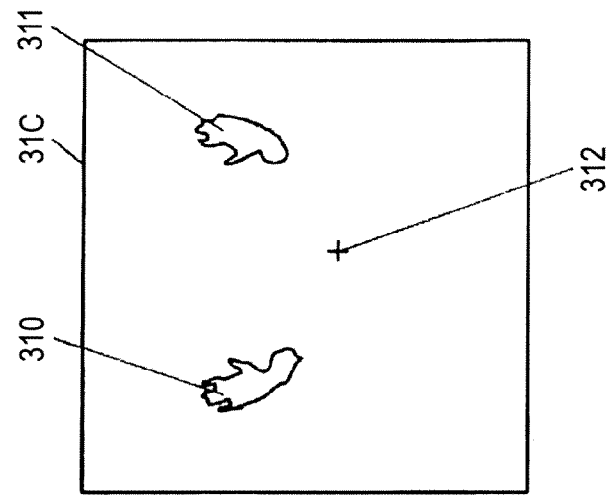
FIGS. 4A-4C schematically show example distance images according to a two-hand coordinates calculating operation and a distance-based center calculating operation.
Figure 4B:
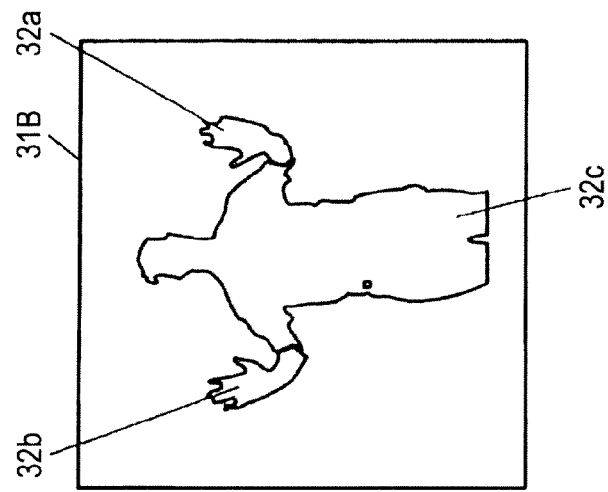
Figure 4A:
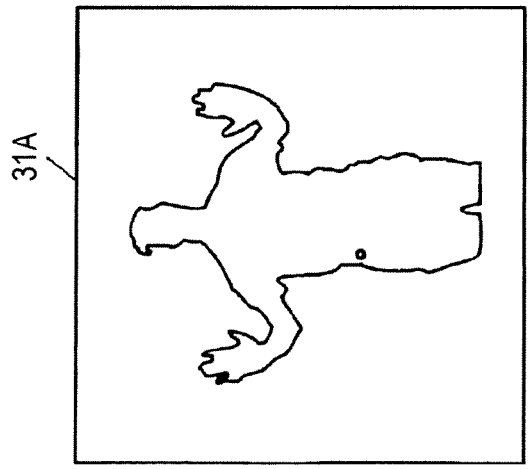

FIGS. 4A-4C schematically show example distance images according to a two-hand coordinates calculating operation and a distance-based center calculating operation.

The distance image acquiring module 20 acquires a distance image as shown in FIG. 4A from the distance sensor 3. Then, the image dividing module 21a groups distance information having similar distance values into divisional regions 32a-32c by the method described above with reference to FIG. 3E and thereby obtains a distance image 31B shown in FIG. 4B. For example, the distances between the distance sensor 3 and the portions of the object corresponding to the divisional regions 32a-32c are 2 m, 2 m, and 2.3 m, respectively.

Then, as shown in FIG. 4C (distance image 31C), the two-hand coordinates calculator 21b detects, as a right-hand-inclusive portion 310 and a left-hand-inclusive portion 311, the divisional regions 32b and 32a having shortest distances, respectively, and acquires the centers of the divisional regions 32b and 32a as right-hand user instruction coordinates and left-hand user instruction coordinates, respectively.

The right-hand-inclusive portion 310 and the left-hand-inclusive portion 311 are determined depending on whether their sets of user instruction coordinates are located on the left or right of the distance-based center 312, which is calculated in a manner described below.

(4) Distance-Based Center Calculating Operation

When the divisional detection surface in the distance image 31B is represented by coordinates (x, y) and the depth as converted into the distance from the depth reference plane 3C is represented by D(x, y), the coordinates ($x_{Center}$, $y_{Center}$, $z_{Center}$) of the distance-based center 312 are given by the following Formulae 1-3:

$$x_{Center} = \frac{\sum_{y=0}\sum_{x=0} x \times D(x, y)}{\sum_{y=0}\sum_{x=0} D(x, y)} \quad (1)$$

$$y_{Center} = \frac{\sum_{y=0}\sum_{x=0} y \times D(x, y)}{\sum_{y=0}\sum_{x=0} D(x, y)} \quad (2)$$

$$z_{Center} = \frac{\sum_{y=0}\sum_{x=0} n(x, y) \times D(x, y)}{\sum_{y=0}\sum_{x=0} n(x, y)} \quad (3)$$

In Formulae 1-3, n(x, y) is equal to 0 when=0 and is equal to 1 when D(x, y)>0.

(5) Operation of Determining an Operation Reference Plane and a Virtual Operation Plane FIGS. 5A-5D schematically show an example relationship between the distance-based center and an operation reference plane and an example relationship between a distance image and the operation reference plane.

As shown in FIG. 5A, the reference plane calculator 21d of the distance image processing module 21 sets an operation reference plane Sz that is spaced by a predetermined interval dz toward the detection surface 30 from the distance-based center Gz (component in the distance direction) calculated by the distance-based center calculator 21c. The reference plane calculator 21d also sets a virtual operation plane Sv that is spaced by a predetermined interval dm toward the detection surface 30 from the operation reference plane Sz.

The distance image 31C shown in FIG. 5B is the same as that shown in FIG. 4C. The user instruction image generator 22b of the display controller 22 divides the right-hand-inclusive portion 310 (divisional region of the distance image 31C) by the operation reference plane Sz into a right hand 310a and a right wrist 310b and divides the left-hand-inclusive portion 311 (divisional region of the distance image 31C) by the operation reference plane Sz into a left hand 311a and a left wrist 311b, and thereby produces a distance image 31D shown in FIG. 5C.

Then, the user instruction image generator 22b extracts, from the distance image 3D, the right hand 310a and the left hand 311a that correspond to the right hand 4R and the left hand 4L of the user 4 that are located on the detection surface 30 side of the operation reference plane Sz, and thereby produces a distance image 31E shown in FIG. 5D.

(6) User Instruction Image Generating Operation and Image Combining Operation

FIGS. 6A-6C schematically show an example operation of generating user instruction images from a distance image and an example operation of combining the user instruction images with a GUI image.

The user instruction image generator 22b produces a distance image 31F shown in FIG. 6A by rotating the distance image 31E shown in FIG. 5D about the vertical axis. Then, the user instruction image generator 22b performs 3D-conversion processing on a left hand 311c and a right hand 310c in the distance image 31F and thereby produces a left-hand-inclusive image 240a and a right-hand-inclusive image 241a shown in FIG. 6B as user instruction images. The 3D-conversion is performed on the outlines of the left hand 311c and the right hand 310c to give them depths. For example, the 3D-conversion processing is such that density values are set in advance for the pixels of each of the left hand 311c and the right hand 310c according to their distances and each of the left hand 311c and the right hand 310c is colored in colors that are generated based on those density values and a predetermined standard skin color.

Then, the user instruction image generator 22b generates shadow images 240b and 241b as additional images (see FIG. 6B) from the left-hand-inclusive image 240a and the right-hand-inclusive image 241a based on the distance relationships between the left hand 4L and the right hand 4R of the user 4 and the virtual operation plane Sv (see FIG. 5A).

As the user instruction image generator 22b performs the above operation of generating the left-hand-inclusive image 240a, the right-hand-inclusive image 241a, and the shadow images 240b and 241b, the GUI generator 22a of the display controller 22 generates a GUI image 242 that includes operation subject images 242a-242c.

Then, the display controller 22 generates a display image 24A by combining the left-hand-inclusive image 240a, the right-hand-inclusive image 241a, and the shadow images 240b and 241b with the GUI image 242, and outputs its video information to the display unit 23. The display unit 23 displays the video information received from the display controller 22. The left-hand-inclusive image 240a, the right-hand-inclusive image 241a, and the shadow images 240b and 241b may be semitransparent to increase the visibility of the GUI image 242.

Each of the left-hand-inclusive image 240a and the right-hand-inclusive image 241a is drawn larger when the distance between the virtual operation plane Sv and the left hand 4L or the right hand 4R of the user 4 is longer. For example, as shown in FIG. 6C, when the distance between the virtual operation plane Sv and the left hand 4L is shorter than the distance between the virtual operation plane Sv and the right hand 4R, the left-hand-inclusive image 240a is drawn and displayed so as to be smaller than the right-hand-inclusive image 241a.

Each of the shadow images 240b and 241b is drawn larger at a position that is more distant from the left-hand-inclusive image 240a or the right-hand-inclusive image 241a when the distance between the virtual operation plane Sv and the left hand 4L or the right hand 4R of the user 4 is longer. For example, the left-hand-inclusive image 240a and the shadow image 240b shown in FIG. 6C correspond to a case that the distance between the virtual operation plane Sv and the left hand 4L is long.

Each of the shadow images 240b and 241b is drawn so as to be closer in size and position to the left-hand-inclusive image 240a or the right-hand-inclusive image 241a when the distance between the virtual operation plane Sv and the left hand 4L or the right hand 4R of the user 4 is shorter. For example, if the right hand 4R of the user 4 is located at the same position as the virtual operation plane Sv, the right-hand-inclusive image 241a and the shadow image 241b are displayed as shown in FIG. 6C.

If the left hand 4L or the right hand 4R of the user 4 is located at the same position as the virtual operation plane Sv, the display controller 22 outputs an operation signal to the input controller 24. The operation signal depends on the position pointed by the left-hand-inclusive image 240a or the right-hand-inclusive image 241a. For example, if as shown in FIG. 6C the operation subject image 242b is pointed by the right-hand-inclusive image 241a, an operation signal corresponding to the operation subject image 242b is output. Likewise, different operation signals are correlated with the respective operation subject images 242a and 242c. If the operation subject image 242a or 242c is pointed by the left-hand-inclusive image 240a or the right-hand-inclusive image 241a, the display controller 22 outputs a corresponding operation signal (control signal) to the input controller 24.

The input controller 24 controls the individual modules of the main body 2 based on a control signal received from the display controller 22. The input controller 24 also controls the individual modules of the main body 2 based on a control signal received from the remote control information receiver 25.

(7) Other Operations

FIGS. 7A-7F schematically show another example operation of combining user instruction images with GUI images.

When the left hand 4L, for example, of the user 4 is stretched out, the user instruction image generator 22b generates a left-hand-inclusive image 240a and a shadow image 240b. Where as shown in FIGS. 7A-7F a display image 24B includes GUI images 243-245 as if they were arranged in the screen depth direction, if the left hand 4L is located on the user 4 side of a virtual operation plane corresponding to the GUI image 243, the display controller 22 combines the shadow image 240b with the GUI image 243 (see FIGS. 7A and 7D).

Likewise, if the left hand 4L is located on the detection surface 30 side of the virtual operation plane corresponding to the GUI image 243 and on the user 4 side of a virtual operation plane corresponding to the GUI image 244, the display controller 22 combines the shadow image 240b with the GUI image 244 (see FIGS. 7B and 7E).

If the left hand 4L is located on the detection surface 30 side of the virtual operation plane corresponding to the GUI image 244 and on the user 4 side of a virtual operation plane corresponding to the GUI image 245, the display controller 22 combines the shadow image 240b with the GUI image 245 (see FIGS. 7B and 7E).

FIGS. 8A-8F schematically show a further example operation of combining user instruction images with a GUI image.

Figure 8A:
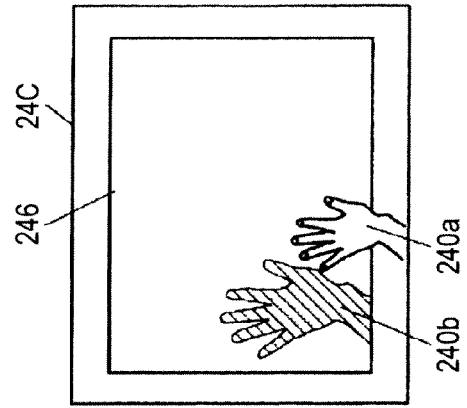
FIGS. 8A-8F schematically show a further example operation of combining user instruction images with a GUI image.

When the left hand 4L, for example, of the user 4 is stretched out, the user instruction image generator 22b generates a left-hand-inclusive image 240a and a shadow image 240b. Where, as shown in FIG. 8D, a virtual illumination source Lv is disposed on the rear-left of the user 4, as shown in FIG. 8A, the display controller 22 generates a display image 24C by combining the shadow image 240b with a GUI image 246 so that the shadow image 240b is located on the right of the left-hand-inclusive image 240a on the screen.

Figure 8B:
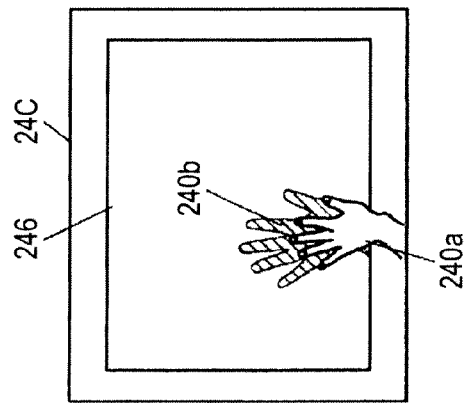
Figure 8C:
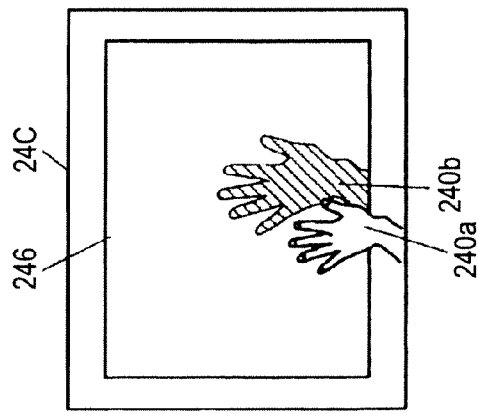
Figure 8D:
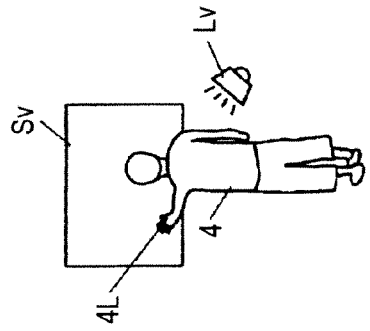
Figure 8E:
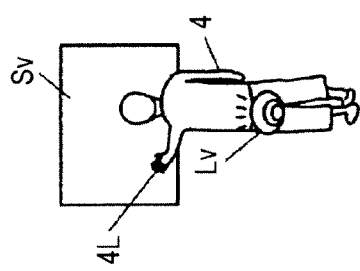

Likewise, where, as shown in FIG. 8E, the virtual illumination source Lv is disposed behind the user 4, as shown in FIG. 8B, the display controller 22 combines the shadow image 240b with the GUI image 246 so that the shadow image 240b is located at the same position in the horizontal direction on the screen.

Figure 8F:
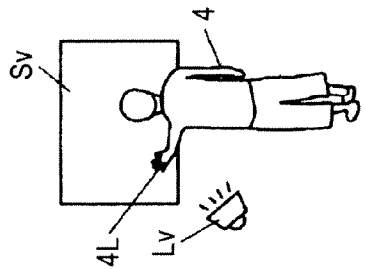

Where, as shown in FIG. 8F, the virtual illumination source Lv is disposed on the rear-right of the user 4, as shown in FIG. 8C, the display controller 22 combines the shadow image 240b with the GUI image 246 so that the shadow image 240b is located on the left of the left-hand-inclusive image 240a on the screen.

Advantages of Embodiment

In the above-described embodiment, the video reproducing apparatus 1 sets an operation reference plane Sz and a virtual operation plane Sv near a user 4 and varies the display relationship between a GUI image 242 and each of a left-hand-inclusive image 240a and a right-hand-inclusive image 241a according to the relationship between the virtual operation plane Sv and each of the left hand 4L and the right hand 4R of the user 4. This allows the user 4 to recognize an operation position of the user 4 in a three-dimensional display and the relationship between and an actual operation position of the user 4 and the operation position of the user 4 in the three-dimensional display.

Furthermore, the video reproducing apparatus 1 generates and displays shadow images 240b and 241b to indicate the display relationship between the GUI image 242 and each of the left-hand-inclusive image 240a and the right-hand-inclusive image 241a. This allows the user 4 to intuitively recognize an operation position of the user 4 in a three-dimensional display and the relationship between and an actual operation position of the user 4 and the operation position of the user 4 in the three-dimensional display.

The drawing sizes of the left-hand-inclusive image 240a, and the right-hand-inclusive image 241a, and the shadow images 240b and 241b may be different than in the embodiment as long as they vary depending on the relationships between the virtual operation plane Sv and the left hand 4L and the right hand 4R of the user 4. The left-hand-inclusive image 240a, and the right-hand-inclusive image 241a, and the shadow images 240b and 241b may be replaced by other images such as pointers and icons.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A video reproducing apparatus comprising:
   a distance image acquiring module configured to acquire distance information about a distance between a user and a distance sensor, based on the distance sensor;
   a user instruction coordinate calculator configured to calculate a user instruction coordinate based on the distance information, wherein the user instruction coordinate represents a coordinate of the distance information which is the closest to the distance sensor;
   a user instruction image generator configured to generate a user instruction image and an additional image based on the user instruction coordinate, wherein the additional image is a shadow image of the user instruction image;

an operation subject image generator configured to generate an operation subject image which is to be operated by the user instruction image; and a display controller configured to display the user instruction image, the additional image and the operation subject image on the same display, based on the user instruction coordinate, and wherein the display controller is configured to display the additional image so as to change a distance between the additional image and the user instruction image, depending on a distance between the user instruction coordinate and a virtual operation plane which is virtually provided between the distance sensor and the user, wherein the distance between the additional image and the user instruction image is increased as the distance between the user instruction coordinate and the virtual operation plane is increased, and wherein the distance between the additional image and the user instruction image is decreased as the distance between the user instruction coordinate and the virtual operation plane is decreased.

2. The apparatus according to claim 1, wherein if the user instruction coordinate is located in the operation subject image, the display controller is configured to output a control signal corresponding to the operation subject image.

3. A video reproducing method comprising:
(a) acquiring distance information about a distance between a user and a distance sensor, based on the distance sensor;
(b) calculating a user instruction coordinate based on the distance information, wherein the user instruction coordinate represents a coordinate of the distance information which is the closest to the distance sensor;
(c) acquiring generate a user instruction image and an additional image based on the user instruction coordinate, wherein the additional image is a shadow image of the user instruction image;
(d) generating an operation subject image which is to be operated by the user instruction image; and
(e) displaying the user instruction image, the additional image and the operation subject image on the same display, based on the user instruction coordinate, and wherein step (e) comprises displaying the additional image so as to change a distance between the additional image and the user instruction image, depending on a distance between the user instruction coordinate and a virtual operation plane which is virtually provided between the distance sensor and the user, wherein the distance between the additional image and the user instruction image is increased as the distance between the user instruction coordinate and the virtual operation plane is increased, and wherein the distance between the additional imageauxilial3T image and the user instruction image is decreased as the distance between the user instruction coordinate and the virtual operation plane is decreased.

* * * * *